Oct. 20, 1959 N. J. HUGHES 2,908,920
METHOD OF MAKING LOCK NUTS
Filed March 15, 1957 3 Sheets-Sheet 1
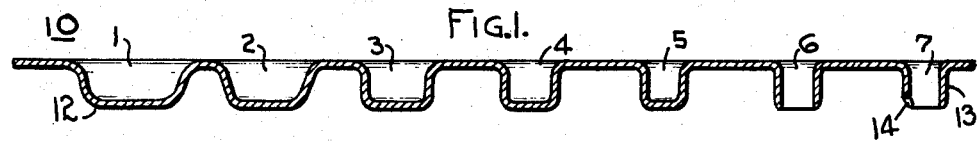
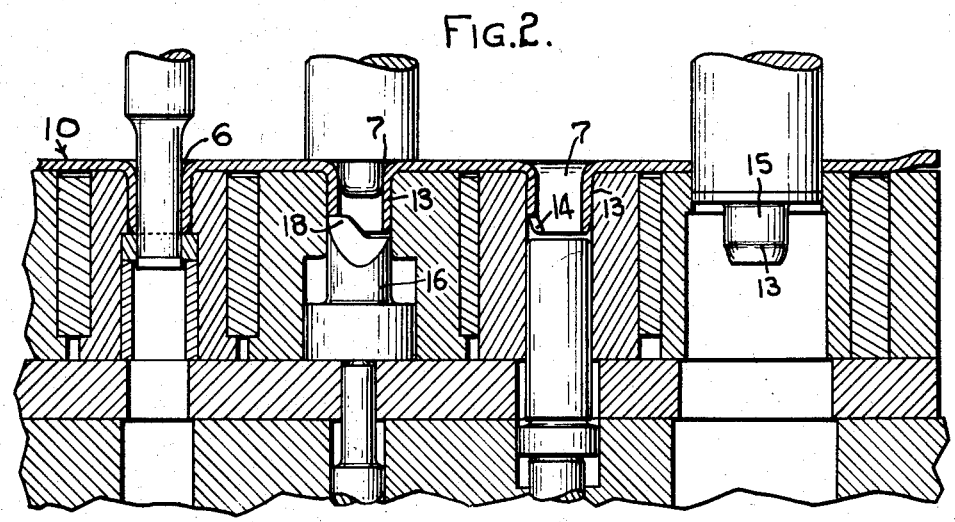
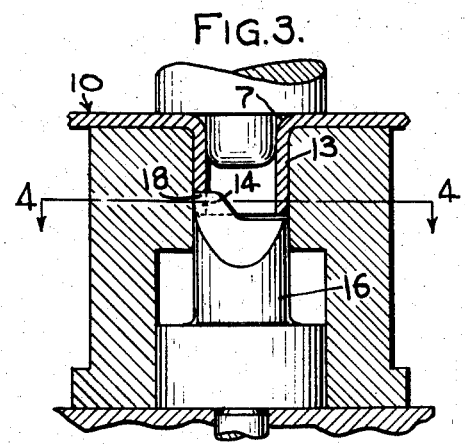
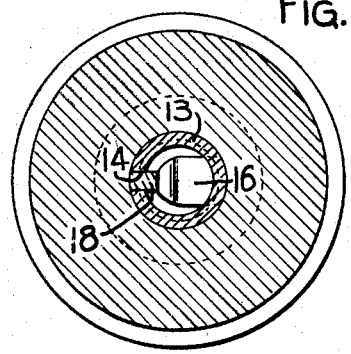
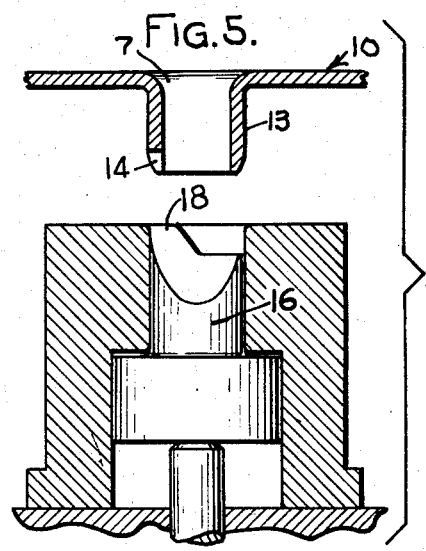
INVENTOR:
NORMAN J. HUGHES,
By Philip E. Parker
ATTORNEY.

Oct. 20, 1959     N. J. HUGHES     2,908,920
METHOD OF MAKING LOCK NUTS

Filed March 15, 1957     3 Sheets-Sheet 2

INVENTOR:
NORMAN J. HUGHES
BY Philip E. Parker
ATTORNEY.

Oct. 20, 1959 N. J. HUGHES 2,908,920
METHOD OF MAKING LOCK NUTS
Filed March 15, 1957 3 Sheets-Sheet 3

INVENTOR:
NORMAN J. HUGHES,
By Philip E. Parker
ATTORNEY.

United States Patent Office 2,908,920
Patented Oct. 20, 1959

2,908,920
METHOD OF MAKING LOCK NUTS

Norman J. Hughes, Melrose, Mass., assignor to United-Carr Fastener Corporation, Boston, Mass., a corporation of Delaware Application March 15, 1957, Serial No. 646,332

2 Claims. (Cl. 10—86)

This invention relates to a method of making self-locking nuts and more specifically to the manufacture of a nut having a V-notched portion in the barrel whereby this V-notched portion may be reduced in diameter to frictionally engage a suitable bolt.

It has been a common practice heretofore in forming such lock-nuts to subject a suitable strip of metal to the action of a series of dies and punches and form a cup-shaped member and then punch a hole off-center in the bottom of this member. By suitable drawing operations the hole becomes elongated and subsequent steps draw the hole into a vertical position on one wall of the tubular body portion where a punch removes the closed end of the cap-shaped member resulting in the hole assuming a V shape.

In the manufacture of such lock nuts this method proved defective in that it was difficult to control the drawing processes so as to align the V-slot properly on the wall of the tubular member or to accurately obtain a slot of predetermined depth.

This invention is designed to overcome the above-noted defects by providing a method of forming V-slots which are uniform and of a predetermined depth.

The object of the invention is to provide a novel method of forming a self-locking nut of the type herein described.

In the drawing:

Fig. 1 is a section of a strip of sheet metal upon which certain operations as indicated have been performed;

Fig. 2 is a fragmentary sectional view of a machine header or the like which is adapted to carry out my improved process.

Fig. 3 is an enlarged view, partly in section, of one step of Fig. 2 showing the notch-forming process.

Fig. 4 is a section on line 4—4 of Fig. 3;

Fig. 5 is a view similar to Fig. 3 showing the strip and punch in a raised position after the formation of the notch;

In carrying out or practicing of the art or process embodying my invention, I take a strip of metal 10, such as, for example, steel, which may be of any length desired and pass the same through a machine press provided with a series of drawing tools capable of forming hollow projections 12 as shown in Fig. 1.

Figure 13:
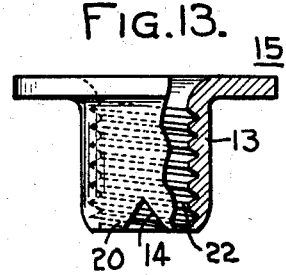
Fig. 13 is a view in elevation, partly in section, of the locknut, after threading.
Figure 14:
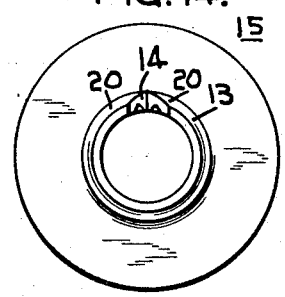
Fig. 14 is a bottom plan view of Fig. 13.

It will be assumed that the strip 10 in traveling through the machine moves from the left toward the right constituting drawing operations 1 through 5, a bottom punching operation at 6 and a notch forming operation at 7. When the various projections of the strip have been converted or changed into tubular body portions 13, then the individual units are cut from the strip 10 and in a separate operation internally threaded as shown in Fig. 13, end portions on either side of the notch crimped inwardly to partially close the notch. This forms an end portion of reduced diameter in which the threads, though of uniform depth and pitch are reduced in diameter relative to the remaining threaded portion of the nut resulting in a frictional gripping and locking of a bolt member inserted therein.

In accordance with the invention the cup-shaped projection 12 has a notch 14 formed in the barrel portion 13 by compressing the cup-shaped member onto the punching tool 16 having a projection 18 thereon as shown in Fig. 2. The metal coming in contact with said punching tool 16 under the impact and pressure of the machine press, as illustrated in Fig. 2, is spread to form the notch 14 without cutting any of the material from the blank. This simplifies what would otherwise complicate the tools if a piece of material was actually to be cut free from the blank.

Following the notch forming operation the device is internally tapped to provide threads 22.

Figure 15:
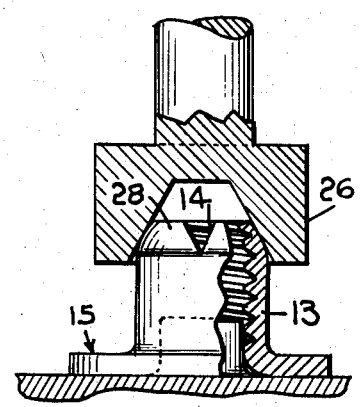
Fig. 15 is a view in elevation, partly in section, showing a method of crimping the locknut.
Figure 16:
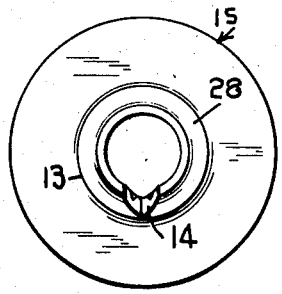
Fig. 16 is a plan view of the locknut as shown in Fig. 15 after the crimping process.

The locking feature is obtained by crimping the end of the tubular body portion 13 inwardly to partially close the notch 14 as shown in Fig. 15 with the notched portion partially closed as shown in Fig. 16. The crimping operation is preferably accomplished by means of a conical punch 26 which is forced down on the end of the nut 13. The resultant crimping is not uniform about the periphery but particularly in the region adjacent to the notch. This forms an end portion 28 which is of lesser diameter than the rest of the nut. When a bolt is threaded onto the nut the resiliency of the metal and the reduced area at the notch allow a certain outward expansion to take place but of such a degree that the bolt is frictionally engaged.

Figure 6:
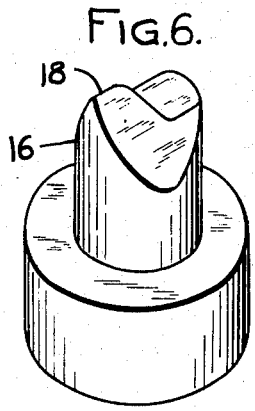
Fig. 6 is a view in perspective of the notch-forming punch.
Figure 7:
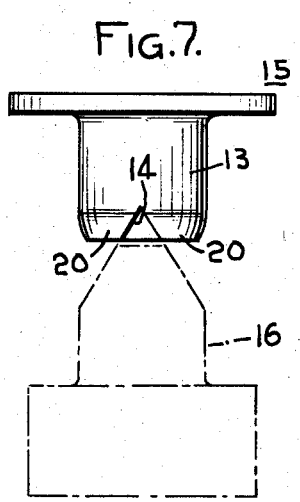
Fig. 7 is a view in front elevation of the lock nut with the punch in dot and dash position.
Figure 8:
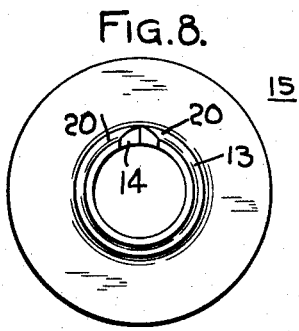
Fig. 8 is a bottom plan view of the lock nut.
Figure 9:
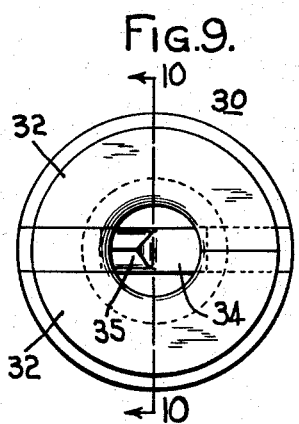
Fig. 9 is a plan view of a modified form of a punch located within the die.
Figure 10:
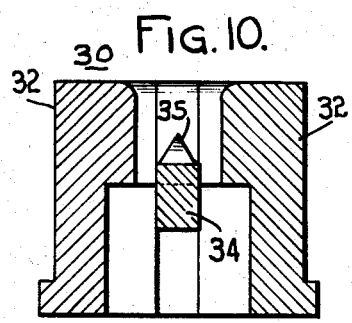
Fig. 10 is a section taken on line 10—10 of Fig. 9.
Figure 11:
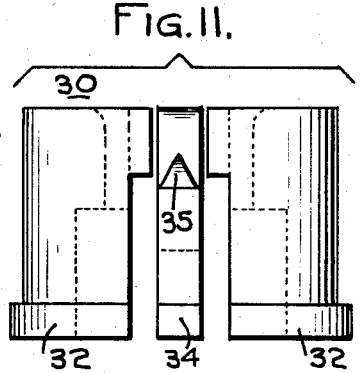
Fig. 11 is an exploded view in elevation of the die and punch as shown in Fig. 9.
Figure 12:
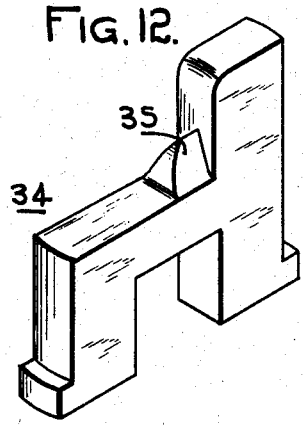
Fig. 12 is a view in perspective of a modified form of the punch.

A modified form of a cutting tool 30 for use in forming the notched portion is shown in Figs. 9, 10, 11 and 12. This deviates from the tool used in Fig. 6 in that it is a sectional die comprising three pieces a split bushing 32 and an insert cutting tool 34 having a V-shaped configuration 35 thereon. Variations in the shape of the notched portion may be accomplished by changing the inserts within the split bushing arrangement without changing the entire tool.

Figure 17:
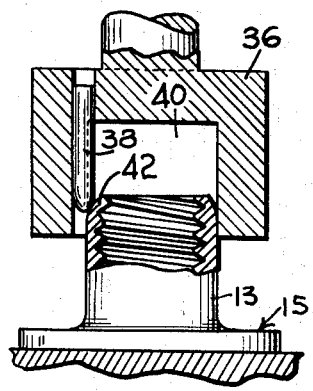
Fig. 17 is a view in elevation, partly in section, of the punch and locknut showing a modified form of crimping the locknut.
Figure 18:
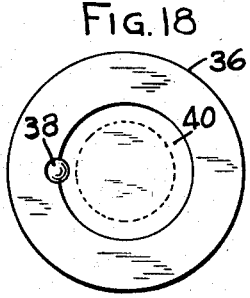
Fig. 18 is a bottom plan view of the crimping punch as shown in Fig. 17.
Figure 19:
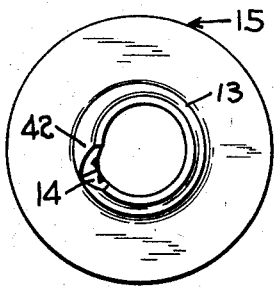
Fig. 19 is a top plan view of the crimped locknut as shown in Fig. 17.

A modified form of crimping the tubular body portion as shown in Figs. 17 and 18 where the conical punch 36 has a doweled pin 38 extending into the die opening 40. The action of the punch forces the trailing corner 42 of the notched portion 14 inward causing a bolt which has been inserted therein to encounter a restricted area.

Figure 20:
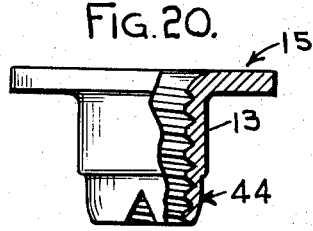
Fig. 20 is a view in elevation, partly in section, of a modified construction of the locknut having a reduced barrel portion.
Figure 21:
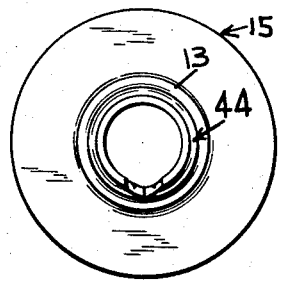
Fig. 21 is a bottom plan view of Fig. 20.

A variation in forming the body of the locknut is shown in Figs. 20 and 21 where the lower barrel portion 44 has been subjected to additional drawing processes resulting in a thinning of the metal adjacent the notch.

It will be thus seen that the present invention provides an improved method for the manufacture of self-locking nuts which are consistently uniform and have a controllable pre-determined depth in the notched V-portion.

Since certain other obvious modifications may be made in this device without departing from the scope of the invention, it is intended that all matter contained herein be interpreted in an illustrative and not in a limiting sense.

I claim:

1. The method of forming a self locking nut from a sheet metal blank comprising drawing a sheet metal blank to form a cup-shaped member having a base and a cylindrical wall extending upwardly therefrom, said cup-shaped member having a centrally disposed bolt receiving opening extending entirely therethrough, forming a notched portion in the end of said wall away from the base by compressing said one end of the wall by means onto a radially extending wedge shaped cutting tool causing the metal which comes into contact therewith to flow into the adjacent lateral wall thereby forming the notch, internally threading said wall and crimping inwardly the metal adjacent said notch to form a restricted end portion for frictional engagement with a bolt inserted therein.

2. The method of forming a self locking nut from a sheet metal blank comprising drawing a sheet metal blank to form a cup-shaped member having a base and a cylindrical wall extending upwardly therefrom, punching out the closed end of said cup-shaped member to form a centrally disposed bolt receiving opening extending entirely therethrough, punching a notched portion by application of punching means axially of said barrel in a portion of the free end of the cylindrical wall while maintaining the cup-shaped member within a closely confined area whereby the metal of the barrel is spread circumferentially and radially inwardly without cutting of metal from the barrel during the notch forming operation, internally threading the bolt receiving opening in the cup-shaped member, inwardly crimping the free end of the barrel on either side of the region adjacent the notched portion to provide an end portion of reduced diameter such that when a bolt is threaded into the opening of the cup-shaped member, the resiliency of the end portion of the nut and the reduced area of the notched portion permits a sufficient degree of expansion to occur while frictionally engaging the bolt in tight engagement therewith.

References Cited in the file of this patent

UNITED STATES PATENTS

| | | |
|---|---|---|
| 353,830 | Stacker | Dec. 7, 1886 |
| 1,833,190 | Tice | Nov. 24, 1931 |

FOREIGN PATENTS

| | | |
|---|---|---|
| 737,454 | Great Britain | Sept. 28, 1955 |